United States Patent
Hirai

(10) Patent No.: US 9,584,611 B2
(45) Date of Patent: Feb. 28, 2017

(54) MANAGEMENT DEVICE AND MANAGEMENT SYSTEM

(71) Applicant: CANON KABUSHIKI KAISHA, Tokyo (JP)

(72) Inventor: Masahito Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 14/296,329

(22) Filed: Jun. 4, 2014

(65) Prior Publication Data

US 2014/0365801 A1 Dec. 11, 2014

(30) Foreign Application Priority Data

Jun. 10, 2013 (JP) ................................ 2013-121840

(51) Int. Cl.
| | | |
|---|---|---|
| G06F 1/00 | (2006.01) | |
| H04L 29/08 | (2006.01) | |
| H04L 12/12 | (2006.01) | |
| H04L 12/26 | (2006.01) | |
| H04L 12/24 | (2006.01) | |

(52) U.S. Cl.
CPC .............. *H04L 67/26* (2013.01); *H04L 12/12* (2013.01); *H04L 67/16* (2013.01); *H04L 41/0213* (2013.01); *H04L 43/0817* (2013.01); *H04L 43/10* (2013.01); *Y02B 60/34* (2013.01)

(58) Field of Classification Search
None
See application file for complete search history.

(56) References Cited

U.S. PATENT DOCUMENTS

| | | | | |
|---|---|---|---|---|
| 9,451,036 | B2* | 9/2016 | Khan | H04L 12/24 |
| 2002/0141392 | A1* | 10/2002 | Tezuka | H04L 12/6418 370/352 |
| 2003/0185104 | A1* | 10/2003 | Goergen | G04G 7/00 368/47 |
| 2009/0089452 | A1* | 4/2009 | Miwa | H04L 41/044 709/241 |
| 2009/0182842 | A1* | 7/2009 | Dutta | H04L 29/06 709/218 |

FOREIGN PATENT DOCUMENTS

JP 2006-215686 A 8/2006

* cited by examiner

*Primary Examiner* — Mohammed Rehman
(74) *Attorney, Agent, or Firm* — Canon U.S.A., Inc. IP Division

(57) ABSTRACT

A hop count between a management device and a management target device is calculated, and a notification destination range of an unspecified notification pertaining to a power supply mode is obtained from the management target device. On the basis of the obtained results, it is determined whether or not an unspecified notification pertaining to the power supply mode can be received from the management target device. Furthermore, on the basis of the result of the determination, the management device requests the management target device to register the management device as an individual notification destination.

9 Claims, 18 Drawing Sheets

FIG. 4

| NOTIFICATION ORIGINATING MAC ADDRESS | MULTICAST ADDRESS | TTL | SLP HEADER | SERVICE TYPE | ATTRIBUTE |
|---|---|---|---|---|---|
| AA:BB:CC:DD:EE:FF | 239.255.255.253 | 4 | 11 | service:service-agent:192.168.1.1 | X-can-PowerState=sleep |

401

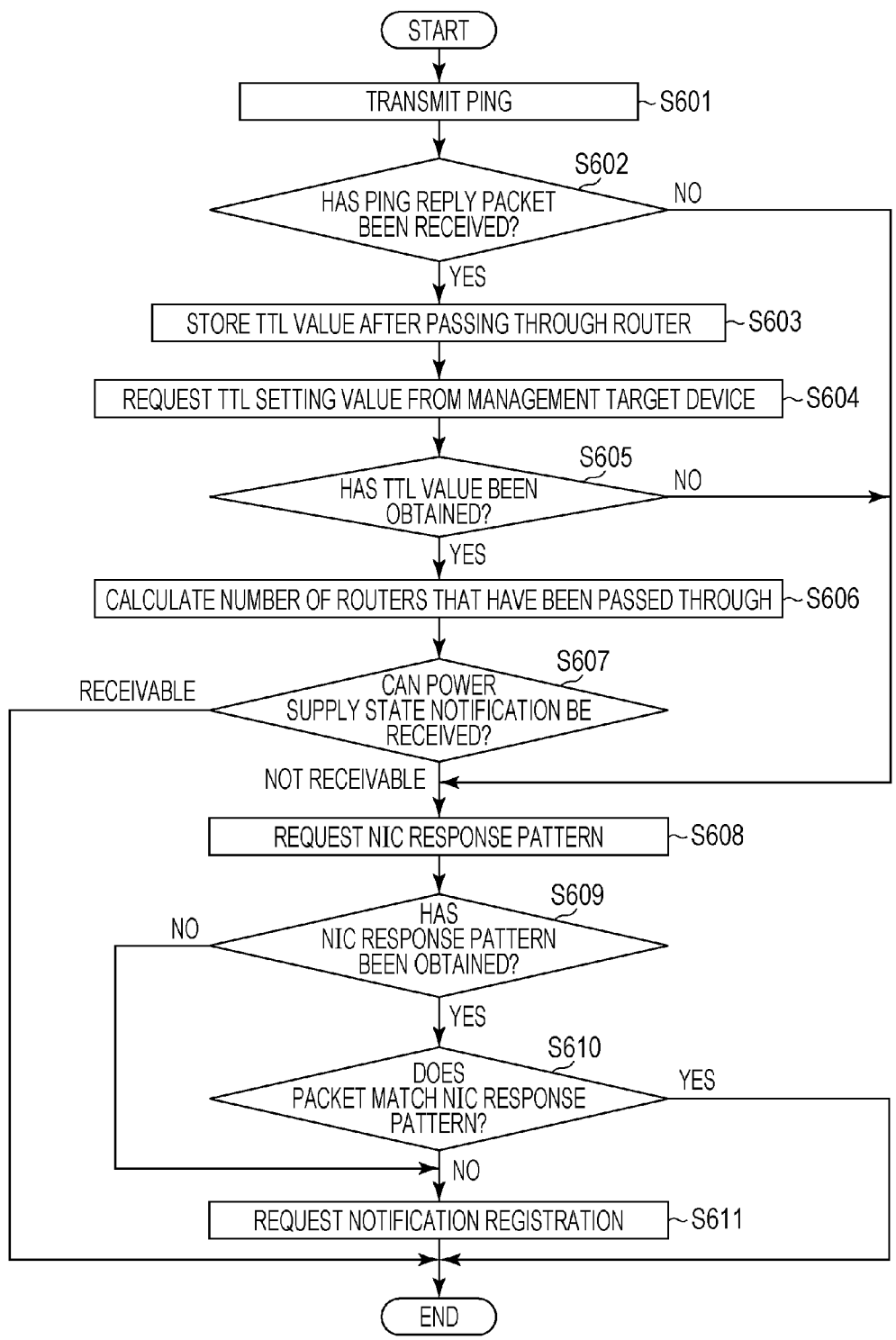

| MAC ADDRESS | IP ADDRESS | MANAGEMENT TARGET DEVICE NAME | PRINT STATUS | POWER SUPPLY MODE |
|---|---|---|---|---|
| AA:BB:CC:DD:EE:1 | 192.168.8.2 | DEVICE A | OPERABLE | NORMAL |
| AA:BB:CC:DD:EE:2 | 192.168.9.4 | DEVICE B | OUT OF PAPER | NORMAL |
| AA:BB:CC:DD:EE:3 | 192.168.10.6 | DEVICE C | OUT OF TONER | LOW |

| TTL | RECEIVER IP ADDRESS | TRANSMITTER IP ADDRESS |
|---|---|---|
| 125 | 192.168.1.123 | 192.168.1.10 |

| ID | DESTINATION Ether | PORT | COMMUNITY | PDU TYPE | DATA |
|---|---|---|---|---|---|
| 1 | OWN DEVICE MAC | 161 | public | 0xA03E | 0x300F060B2B06010201190305010 2|
| 2 | OWN DEVICE MAC | 161 | public | 0xA03E | 0x300F060B2B06010201190305010 1|

902

| ID | DESTINATION Ether | ORIGINATING Ether | PORT | COMMUNITY | PDU TYPE | DATA |
|---|---|---|---|---|---|---|
| 1 | THE OTHER DEVICE MAC | OWN DEVICE MAC | 161 | public | 0xA241 | 0x3010006 0B2B0601020119030 2010501 |
| 2 | THE OTHER DEVICE MAC | OWN DEVICE MAC | 161 | public | 0xA241 | 0x3010006 0B2B0601020119030 5010101 |

FIG. 12

| SLP HEADER | SERVICE TYPE | ATTRIBUTE | NOTIFICATION ORIGINATING MAC ADDRESS | NOTIFICATION DESTINATION ADDRESS |
|---|---|---|---|---|
| 11 | service:service-agent:192.168.1.1 | X-can-PowerState=sleep | AA:BB:CC:DD:EE:FF | 192.168.1.3 |

| SLP HEADER | SERVICE TYPE | ATTRIBUTE | NOTIFICATION ORIGINATING MAC ADDRESS | NOTIFICATION DESTINATION ADDRESS |
|---|---|---|---|---|
| 11 | service:service-agent:192.168.1.100 | X-can-PowerState-Notification-Received | AA:BB:CC:DD:EE:FF | 192.168.1.10 |

1501

| PORT NUMBER | PROTOCOL |
|---|---|
| 161 | SNMP |
| 427 | SLP |

1901

MANAGEMENT DEVICE AND MANAGEMENT SYSTEM

BACKGROUND OF THE INVENTION

Field of the Invention

The present invention relates to methods for managing devices having multiple power supply modes.

Description of the Related Art

Some management devices that manage management target devices, such as a printer and a computer, periodically request information, such as status information, from the management target devices. In order to respond to such requests from the management devices, the management target devices need to be supplied with a certain amount of power, and it is difficult to keep the management target devices in a low power consumption mode.

Meanwhile, a technique is being considered in which a management target device notifies a management device of its power supply mode when the management target device enters a low power consumption mode and when the management target device returns from the low power consumption mode, and the management device, upon receiving the notification, refrains from requesting information from the management target device while the management target device is in the low power consumption mode so as to allow the management target device to stay in the low power consumption mode (e.g., Japanese Patent Laid-Open No. 2006-215686).

However, even if the management target device is to notify the management device of the power supply mode, if the notification of the power supply mode is transmitted to unspecified destinations through multicasting, an appropriate TTL value needs to be set relative to a hop count. If the TTL value is not set appropriately, the notification does not reach the management device, and the management target device needs to return from the low power consumption mode. Alternatively, there is a technique in which a management target device responds to a periodic request for information from a management device while the management target device remains in a low power consumption mode, and the management target device can respond only to predefined inquiries while the management target device is in the low power consumption mode.

SUMMARY OF THE INVENTION

The present invention is directed to suppressing, as compared to an existing technique, instances in which a management target device returns from a low power consumption mode in response to a request for information from a management device.

According to an aspect of the present invention, a management device is configured to manage, through a network, at least one management target device having multiple power supply modes, and the management device includes a first obtaining unit configured to obtain a hop count between the management device and the management target device, a second obtaining unit configured to obtain, from the management target device, a notification destination range of an unspecified notification pertaining to a power supply mode, a determining unit configured to determine whether or not the unspecified notification pertaining to the power supply mode can be received from the management target device on the basis of the hop count obtained by the first obtaining unit and the notification destination range obtained by the second obtaining unit, and a requesting unit configured to request the management target device to register the management device as an individual notification destination on the basis of a determination result of the determining unit.

Further features of the present invention will become apparent from the following description of exemplary embodiments with reference to the attached drawings.

BRIEF DESCRIPTION OF THE DRAWINGS

FIG. 4 illustrates content of a packet to be transmitted by a management target device through multicasting.

FIG. 6A illustrates a flowchart of processing carried out at a management device side according to a first exemplary embodiment.

FIG. 9 illustrates possible NIC response patterns.

FIG. 12 illustrates content of a packet for an individual notification transmitted by the management target device.

FIG. 15 illustrates a response packet of a management device responding to an individual notification from a management target device according to the second exemplary embodiment.

DESCRIPTION OF THE EMBODIMENTS

Hereinafter, exemplary embodiments for embodying the present invention will be described with reference to the drawings. Note that, unless indicated otherwise, a CPU (computer) in each component of a given device carries out operations described hereinafter.

First Exemplary Embodiment

Figure 1:
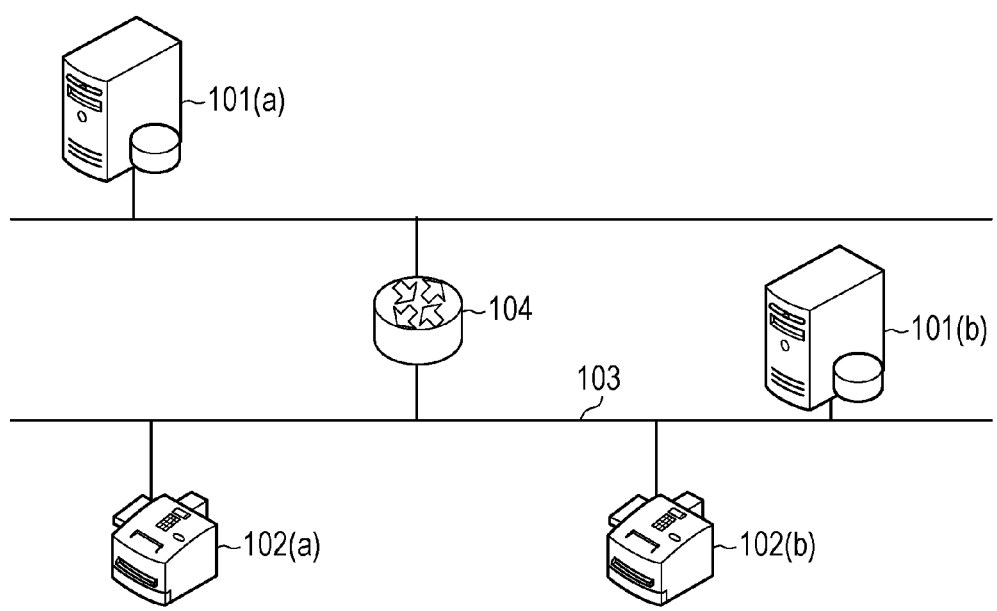
FIG. 1 illustrates an overall configuration of a system.

FIG. 1 illustrates an overall configuration of a management system for embodying the present invention. A management device 101 is connected to a management target device 102, such as a printer, through a network 103. The management device 101 periodically obtains information, such as a print status, from the management target device 102, which is an image forming device. The management target device 102 notifies unspecified destinations of its power supply mode through multicasting or broadcasting, which will be described later. Hereinafter, such a notification to an unspecified destination will be referred to as an unspecified notification. The management device 101, which receives the power supply mode notification, refrains from obtaining information from the management target device 102 while the management target device 102 is in a low power consumption mode. This allows the management target device 102 to return to a normal power consumption mode from the low power consumption mode, as necessary, for carrying out print processing or the like. Here, a protocol, such as the SNMP, for managing devices is used to obtain the aforementioned information. Note that FIG. 1 illustrates an example in which a router 104 is provided between a management device 101(a) and management target devices 102(a) and 102(b), and a router is not provided between a management device 101(b) and the management target devices 102(a) and 102(b). When a TTL value of the power supply mode notification transmitted from the management target device 102(a) or 102(b) is set to 0, that notification reaches the management device 101(b) but does not reach the management device 101(a). The TTL value, which is a value that indicates a period for which a packet is valid, is expressed by an integer from 0 to 255 and is reduced by one each time a given packet passes through a router or the like. When the TTL value of a packet becomes 0, that packet is discarded.

Figure 2:
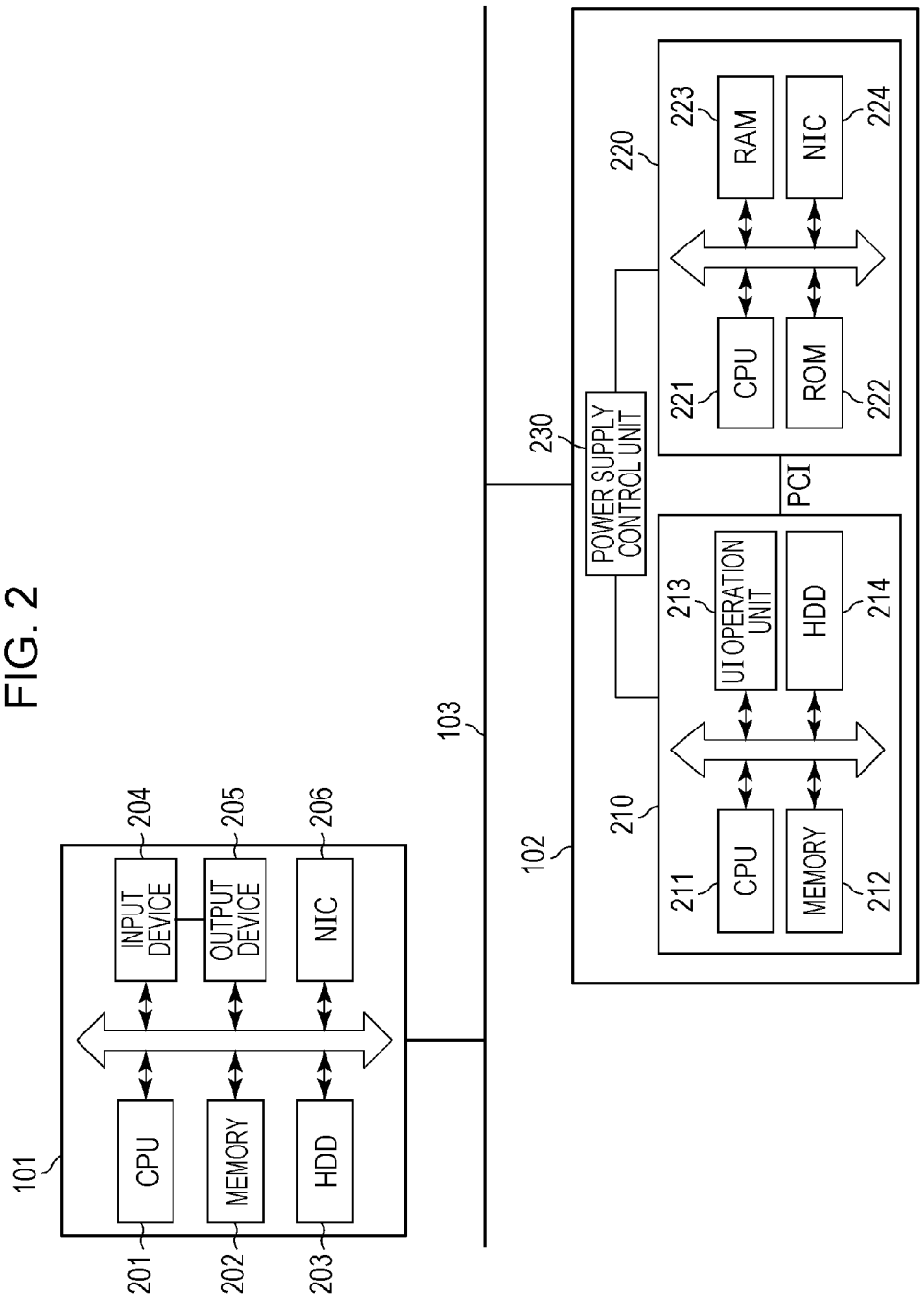
FIG. 2 illustrates a detailed hardware configuration of the system.

FIG. 2 illustrates a hardware configuration of the overall system for embodying the present invention. Referring to FIG. 2, a CPU 201 of the management device 101 loads a program pertaining to the present invention from an HDD 203 onto a memory 202 and executes the program. An output device 205 displays a screen for accepting information, such as an IP address of a management target device 102, necessary for executing the program. An input device 204 accepts a user input on content displayed on the output device 205. An NIC (communication control unit) 206 transmits and receives packets.

The management target device 102 illustrated in FIG. 2 includes a main body control unit 210, a communication control unit 220, and a power supply control unit 230. When a function, such as printing, of the main body control unit 210 is to be used, the power supply control unit 230 controls power so that the management target device 102 is in a normal power consumption mode in which power is supplied to the main body control unit 210 and the communication control unit 220. Meanwhile, when the functions of the main body control unit 210 are not to be used, the power supply control unit 230 controls power so that the management target device 102 is in a low power consumption mode in which power is not supplied to a primary section of the main body control unit 210 and power is only supplied to a portion (power supply button (not illustrated)) of a UI operation unit 213 of the main body control unit 210 and to the communication control unit 220. A CPU 211 of the main body control unit 210 loads a program pertaining to the present invention from an HDD 214 onto a memory 212 and executes the program. The UI operation unit 213 accepts device setting information, such as a TTL value described later, from the user and stores the device setting information in the HDD 214. A CPU 221 of the communication control unit 220 loads a program pertaining to the present invention from a ROM 222 onto a RAM 223 and executes the program. An NIC 224 transmits and receives packets. Note that the power supply control unit 230 may control the power stepwise in three or more power supply modes, instead of controlling the power between the two power supply modes described above.

Figure 3:
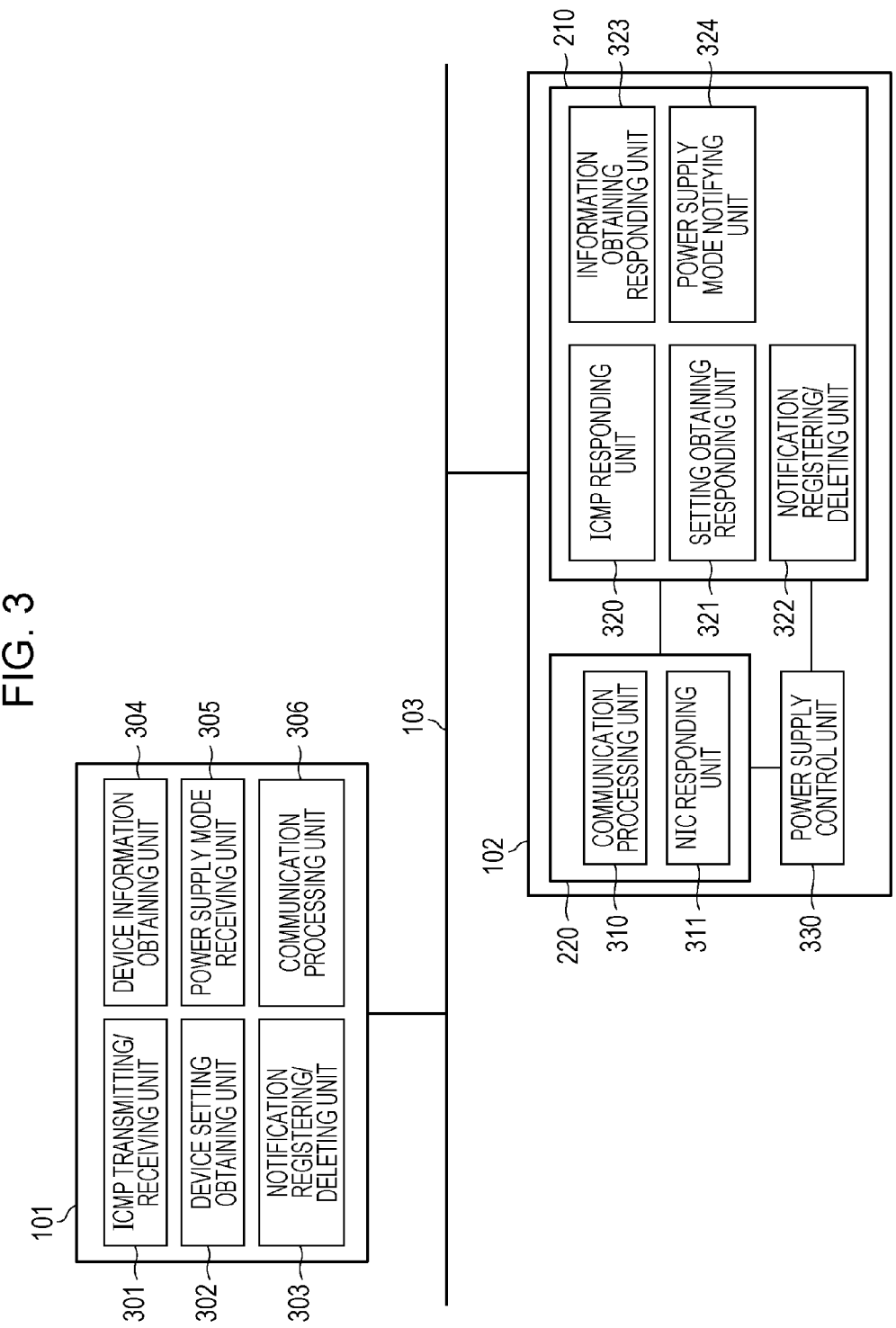
FIG. 3 illustrates a detailed software configuration of the system.

FIG. 3 illustrates a software configuration for embodying the present invention. An ICMP transmitting/receiving unit 301 of the management device 101 transmits and receives a PING packet through the ICMP protocol. The ICMP is a protocol for transferring an error message or a control message of the IP and is used among computers and network devices connected through the TCP/IP for confirming the statuses among one another. A device setting obtaining unit 302 obtains a TTL value of a power supply mode notification transmitted from the management target device 102 through multicasting. The device setting obtaining unit 302 also obtains, from the management target device 102, an NIC response pattern, which will be described later, for the communication control unit 220 of the management target device 102 to respond to a request from the management device 101. A notification registering/deleting unit 303 requests the management target device 102 to register or delete the management device 101 in or from an individual notification list of the management target device 102. A device information obtaining unit 304 periodically requests information on the power supply mode from the management target device 102 except while the management target device 102 is in the low power consumption mode. A power supply mode receiving unit 305 receives a power supply mode notification, which will be described later, from the management target device 102. A communication processing unit 306 controls transmission and reception of packets.

Figure 5:
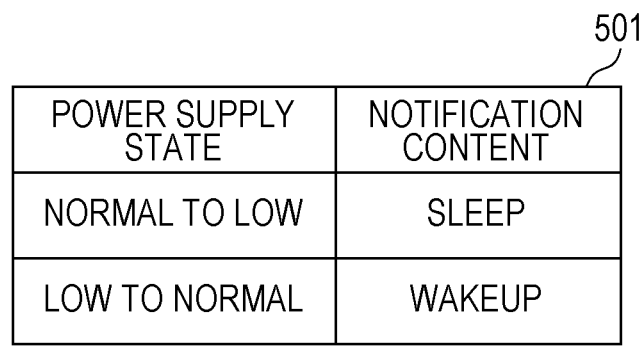
FIG. 5 illustrates power supply mode types to be notified by the management target device.

A power supply control unit 330 of the management target device 102 shuts off power supply to the main body control unit 210 while the main body control unit 210 is not carrying out any processing. Meanwhile, the power supply control unit 330 starts supplying power to the main body control unit 210 when the main body control unit 210 is to carry out processing. A power supply mode notifying unit 324 of the main body control unit 210 refers to a set value of the TTL value to be used in multicasting, which is stored in the memory 212 of the main body control unit 210, when the power supply mode changes, or in other words, when the power supply to the main body control unit 210 is shut off and when the power supply resumes, to thus generate a power supply mode notification packet for multicasting. A communication processing unit 310 transmits the generated power supply mode notification packet. A power supply mode notification packet 401 for multicasting includes a multicast address, a TTL value, and an attribute indicating the power supply mode, as illustrated in FIG. 4. FIG. 5 illustrates content of a power supply mode notification 501 to be transmitted by the management target device 102. When the power supply is shut off, the management target device 102 transmits the power supply mode notification packet 401 of FIG. 4 in which "SLEEP" is entered under the attribute indicating the power supply mode, and when the power supply resumes, the management target device 102 transmits the power supply mode notification packet 401 of FIG. 4 in which "WAKEUP" is entered under the attribute indicating the power supply mode. The power supply mode notifying unit 324 also notifies an individual destination of the power supply mode through unicasting, which will be described later. Hereinafter, a notification to an individual destination will be referred to as an individual notification. An information obtaining responding unit 323 responds to a request for device information from the management device 101. An ICMP responding unit 320 replies to a request for a PING packet from the management device 101. A TTL value to be used in this case is a TTL value for PING set in the management target device 102. A setting obtaining responding unit 321 responds to a request for setting information, such as a TTL value and an NIC response pattern, from the management device 101. A notification registering/deleting unit 322 registers or deletes an individual notification destination of the power supply mode in or from an individual notification list in response to a registration request or a deletion request transmitted from the management device 101. The individual notification will be described later. The communication processing unit 310 of the communication control unit 220 transmits and receives packets to and from the management device 101. An NIC responding unit 311 creates a response packet to the management device 101 without using the main body control unit 210 through an NIC response pattern, which will be described later, in response to an information obtaining request from the management device 101. In other words, as long as a response packet corresponds to a registered NIC response pattern, the NIC responding unit 311 can respond to the management device 101 without power being supplied to the main body control unit 210.

Figure 6B:
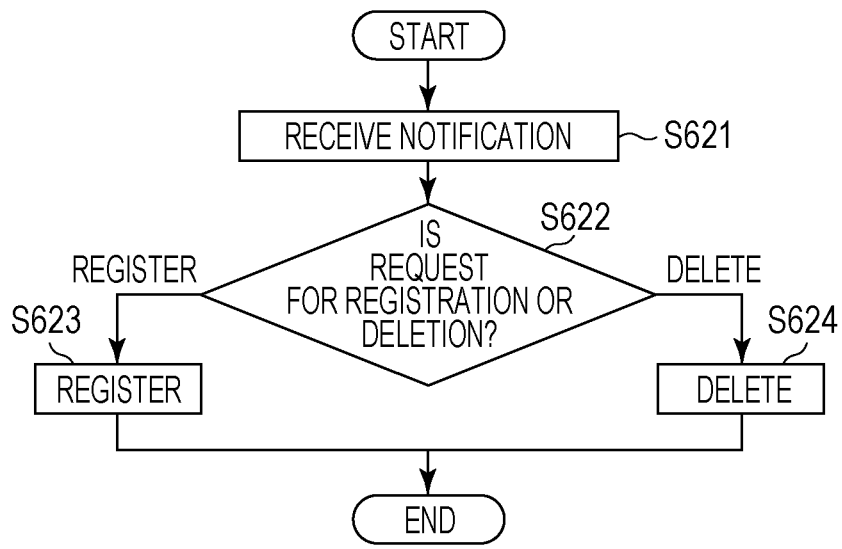
FIG. 6B illustrates a flowchart of processing carried out at a management target device side according to the first exemplary embodiment.
Figure 6C:
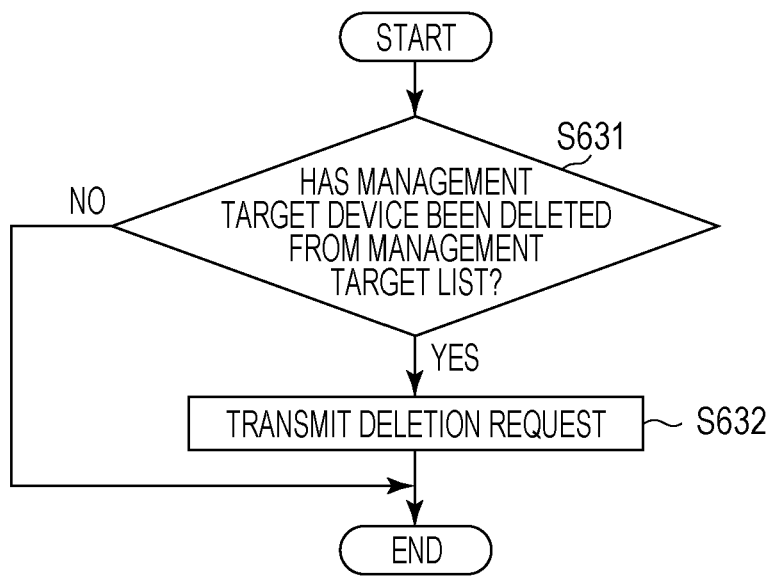
FIG. 6C illustrates a flowchart of processing pertaining to a deletion request carried out at the management device side according to the first exemplary embodiment.

FIGS. 6A through 6C illustrate flowcharts for embodying the present invention. FIG. 6A is a flowchart of processing carried out at the management device side. FIG. 6B is a flowchart of processing carried out at the management target device side. FIG. 6C is a flowchart of processing carried out at the management device side when a management target device ceases to be a management target. The processing flow will be described with reference to FIGS. 6A through 6C. The management device 101 manages the management target device 102 with the use of a management target list 701 illustrated in FIG. 7. The management target list 701 includes a MAC address and an IP address of each of management target devices, the names of the management target devices, the statuses indicating whether or not the management target devices are available for printing, and the power supply modes of the management target devices. Upon information, such as the IP address of the management target device 102, inputted through the input device 204 being registered in the management target list 701, in step S601 of FIG. 6, the ICMP transmitting/receiving unit 301 of the management device 101 generates a PING transmission packet. The generated PING transmission packet is transmitted to the management target device 102 by the communication processing unit 306 through the network 103. A transmitted PING packet 801 includes a TTL value, as illustrated in FIG. 8, and the TTL value is reduced by one each time the PING packet passes through a router. In step S602, it is determined whether or not the ICMP transmitting/receiving unit 301 has received a PING reply packet returned by the management target device 102. If the ICMP transmitting/receiving unit 301 has received a PING reply packet from the management target device 102, in step S603, the ICMP transmitting/receiving unit 301 extracts the TTL value from the received packet and stores the TTL value in the memory 202. In step S604, the device setting obtaining unit 302 requests a multicast TTL value and a prescribed value for a PING TTL value from the management target device 102. Note that the stated multicast TTL value corresponds to a notification destination range of an unspecified notification, and an operation of obtaining the notification destination range corresponds to second obtaining. In step S605, the device setting obtaining unit 302 determines whether or not the management target device 102 has responded to the request for the TTL value, and if the management target device 102 has responded to the request, the processing proceeds to step S606. In step S606, the notification registering/deleting unit 303 calculates the number of routers through which the packet has passed, or in other words, the hop count between the management device 101 and the management target device 102 by subtracting the TTL value stored in step S603 from the prescribed value of the PING TTL value obtained from the management target device 102. The stated operation corresponds to first obtaining. In step S607, the notification registering/deleting unit 303 compares the obtained hop count with the multicast TTL value obtained in step S604 so as to determine whether or not the management device 101 is capable of receiving the multicast power supply mode notification transmitted by the management target device 102. If the notification registering/deleting unit 303 determines in step S607 that the management device 101 can receive the multicast power supply mode notification, the processing is terminated. If the notification registering/deleting unit 303 determines in step S607 that the management device 101 cannot receive the multicast power supply mode notification, the processing proceeds to step S608.

Figure 10:
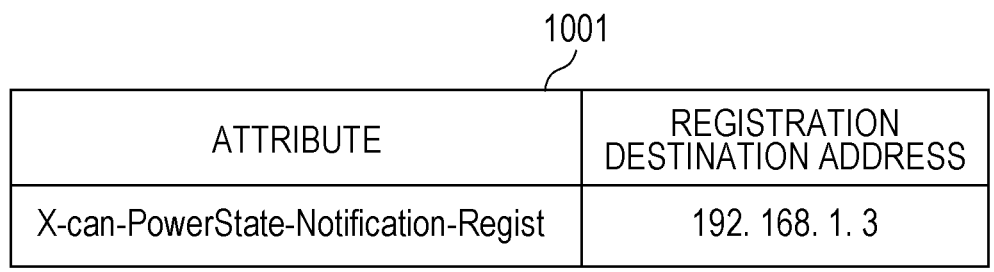
FIG. 10 illustrates a packet to be transmitted from the management device in order to be registered in an individual notification list.

In step S608, the device setting obtaining unit 302 requests an NIC response pattern from the NIC responding unit 311 of the management target device 102. The NIC response pattern is structured as illustrated in FIG. 9 and indicates a pattern of a packet to be received and a response packet corresponding to the received pattern. For example, in a case in which the management target device 102 receives a packet that matches ID 1 in a table 901 illustrated in FIG. 9, the NIC responding unit 311 transmits a packet with the structure of ID 1 in a table 902 to the management device 101. If a reply packet is not received in a predetermined period of time in step S602 or in step S605, the processing proceeds to step S608. In step S609, the notification registering/deleting unit 303 determines whether or not the NIC response pattern has been obtained from the management target device 102, and if the NIC response pattern is not obtained, the processing proceeds to step S611. If the NIC response pattern has been obtained in step S609, the processing proceeds to step S610. In step S610, the notification registering/deleting unit 303 determines whether or not a packet to be transmitted by the management device 101 for obtaining information from the management target device 102 matches the obtained NIC response pattern. The stated operation serves to determine whether or not the management target device 102 can carry out response processing only with the communication processing unit 310 while remaining in the low power consumption mode. If it is determined in step S610 that the packet matches the NIC response pattern, the processing is terminated. If it is determined in step S610 that the packet does not match the NIC response pattern, the processing proceeds to step S611. In step S611, the notification registering/deleting unit 303 requests the management target device 102 to register the management device 101 for an individual notification of the power supply mode. The stated individual notification registration request is made through an SLP packet 1001 including an attribute for power supply mode notification registration illustrated in FIG. 10.

In step S621 of FIG. 6B, the management target device 102 receives the request for the power supply mode individual notification transmitted by the management device 101 in step S611. In step S622, the management target device 102 determines whether the received request for the individual notification is a registration request or a deletion request. If the received request is a registration request, in step S623, the notification registering/deleting unit 322 stores, as a notification destination IP address, the IP address of the management device 101 that has transmitted the request in an individual notification list 1101, illustrated in FIG. 11, of the management target device 102. Meanwhile, if the received request is a deletion request, in step S624, the notification registering/deleting unit 322 deletes the IP address of the management device 101 that has transmitted the request from the individual notification list 1101, illustrated in FIG. 11, of the management target device 102. In a case in which the management device 101 has deleted a management target device from the management target list 701 so as to exclude the management target device from the management targets, the management device 101 transmits a deletion request to that management target device so as to be deleted from the power supply mode individual notification list.

The individual notification list 1101 is stored in a non-volatile storage area, such as the HDD 214, and thus the power supply mode can be notified on the basis of the individual notification list 1101 even after the management target device 102 is restarted after the power supply is turned off.

Figure 11:
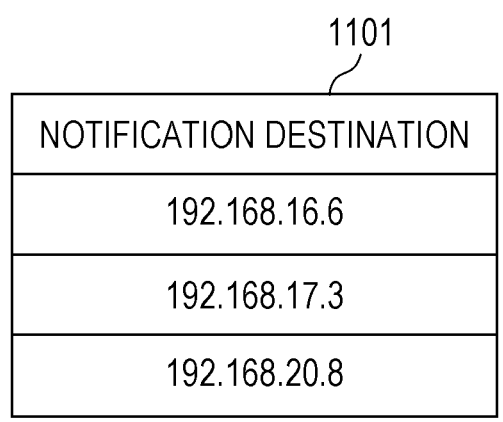
FIG. 11 illustrates a power supply mode individual notification list.

When the power supply mode changes in the management target device 102, the power supply mode notifying unit 324 transmits the multicast power supply mode notification through the packet 401 illustrated FIG. 4 and also transmits, to the management device 101, a power supply mode notification 1201 with a designated destination, as illustrated in FIG. 12, for each notification destination IP address stored in the individual notification list 1101 illustrated in FIG. 11. The power supply mode notification 1201 transmitted by the management target device 102 is similar in content to the power supply mode notification 501 illustrated in FIG. 5. Specifically, the management target device 102 makes a notification of "SLEEP" when the management target device 102 shifts from the normal power consumption mode to the low power consumption mode, and makes a notification of "WAKEUP" when the management target device 102 returns to the normal power consumption mode from the low power consumption mode.

Figure 7:
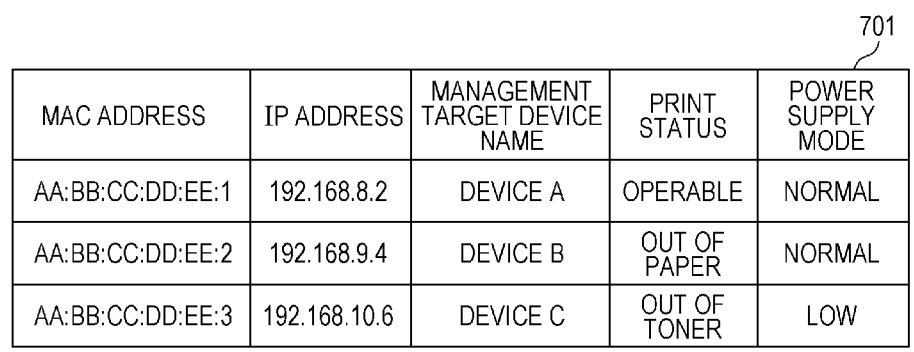
FIG. 7 illustrates a management target list.
Figure 8:
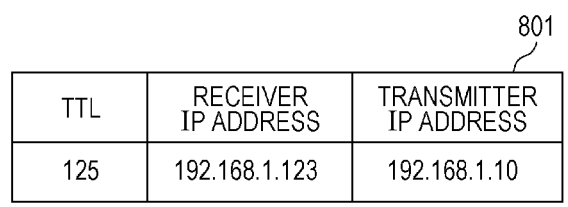
FIG. 8 illustrates content of a PING packet.

Upon receiving the power supply mode notification, the management device 101 updates the power supply mode of the corresponding management target device 102 in the management target list 701 illustrated in FIG. 7. The management device 101 checks the power supply mode in the management target list 701 prior to making a periodic information obtaining request to the management target device 102. While the power supply mode indicates SLEEP, the management device 101 does not make an information obtaining request, and the management device 101 makes an information obtaining request while the power supply mode does not indicate SLEEP. Through this configuration, the management device 101 does not make an information obtaining request to the management target device 102 while the management target device 102 is in the low power consumption mode, and the management target device 102 can thus remain in the low power consumption mode for an extended period of time.

Figure 13:
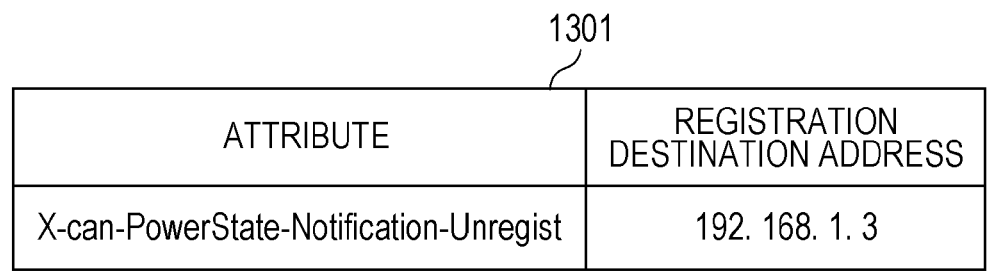
FIG. 13 illustrates a packet issued by a management device requesting that the management device be deleted from the individual notification list.

In step S631 of FIG. 6C, it is determined whether or not the management target device 102 has been deleted from the management target list 701, and if it is determined that the management target device 102 has been deleted from the management target list 701, the processing proceeds to step S632. In step S632, the notification registering/deleting unit 303 transmits, to the management target device 102, a packet 1301 having an attribute indicating deletion, as illustrated in FIG. 13, as a deletion request. Upon receiving the deletion request, in step S622 of FIG. 6B, the management target device 102 determines whether or not the received deletion request is a deletion request. If the management target device 102 determines that the received deletion request is a deletion request, in step S624, the notification registering/deleting unit 322 deletes the management device 101 from the individual notification list 1101 illustrated in FIG. 11. Through this configuration, the management target device 102 can update the individual notification list 1101 stored in a non-volatile storage device in accordance with the actual management status, and transmission of an unnecessary power supply mode notification can be suppressed.

Second Exemplary Embodiment

Figure 14:
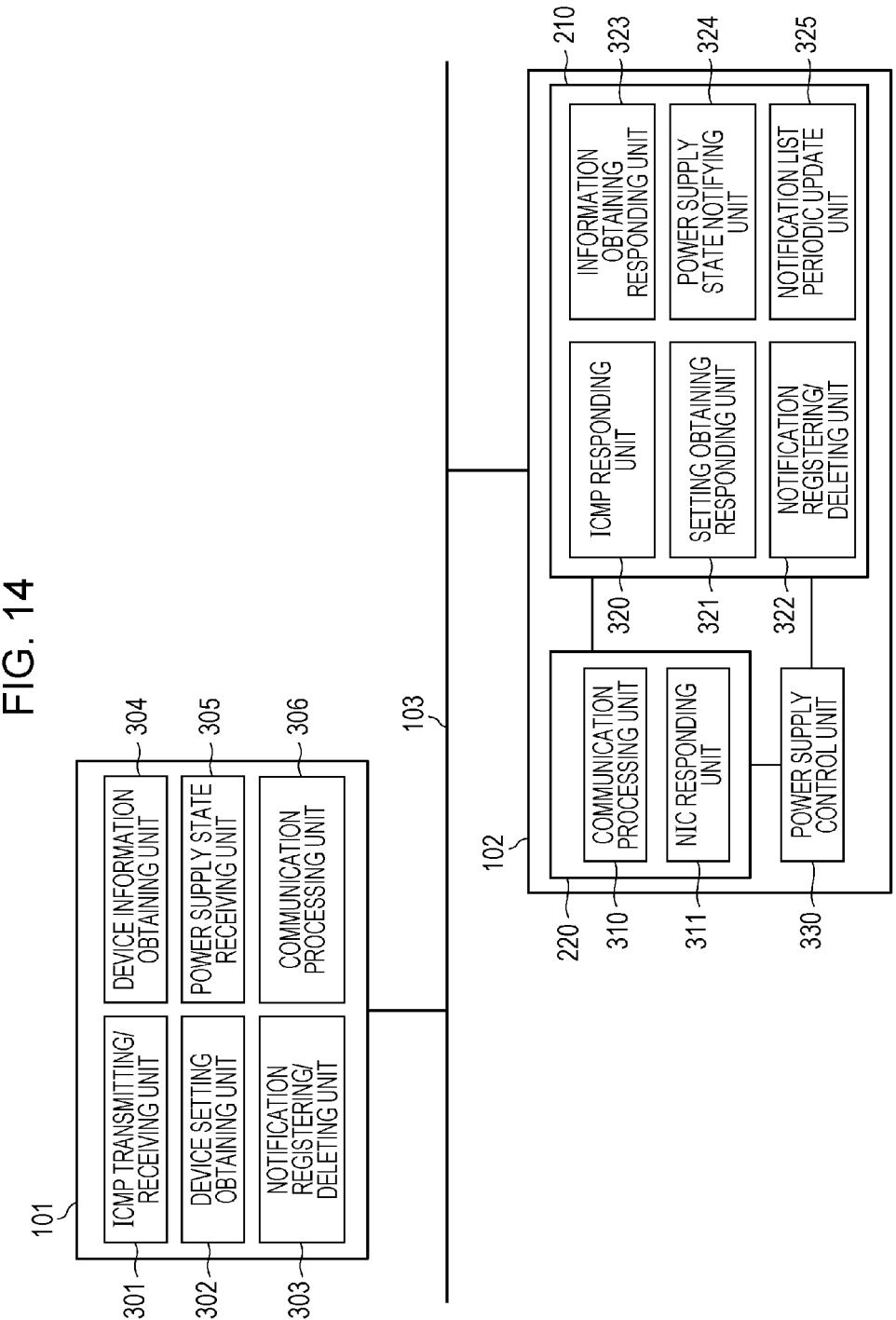
FIG. 14 illustrates a detailed software configuration of a system according to a second exemplary embodiment.
Figure 16:
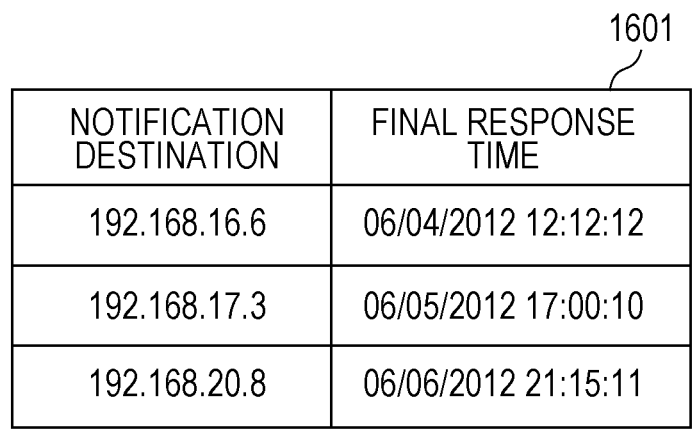
FIG. 16 illustrates an individual response list including a response time according to the second exemplary embodiment.
Figures 19, 20:
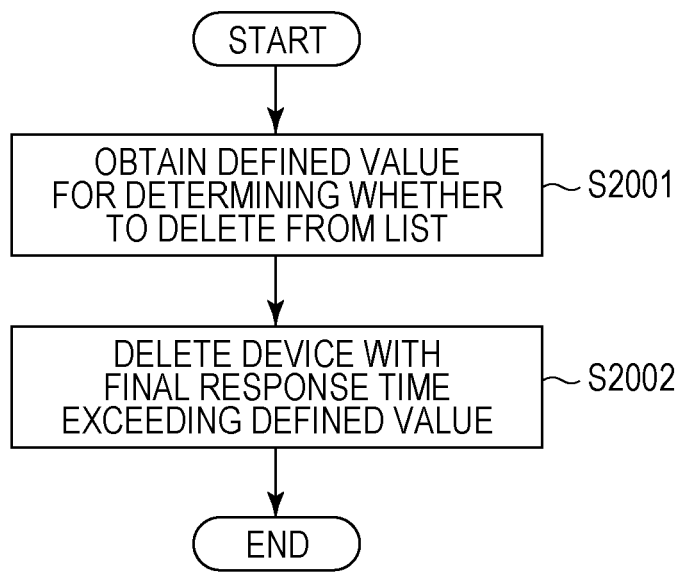
FIG. 19 illustrates a management type list.
FIG. 20 illustrates a flowchart of a periodic update.

A second exemplary embodiment will now be described. The network configuration and the hardware configuration of the second exemplary embodiment are the same as those of the first exemplary embodiment. FIG. 14 illustrates a software configuration of the second exemplary embodiment. In addition to the software configuration of the first exemplary embodiment, a notification list periodic update unit 325 is further provided in the management target device 102, and thus the individual notification list can be updated periodically. In addition, as compared with the individual notification list 1101 illustrated in FIG. 11, an individual notification list 1601 illustrated in FIG. 16 allows a response time at which a response to the power supply mode notification is received from the management device 101 to be recorded. FIG. 20 is a flowchart of processing of periodically updating the individual notification list 1601. In the second exemplary embodiment, when the management device 101 receives, from the management target device 102, a power supply mode notification issued upon a change in the power supply mode, the power supply mode receiving unit 305 of the management device 101 transmits a response 1501 illustrated in FIG. 15 to the management target device 102. Upon receiving the response 1501, the management target device 102 overwrites the final response time in the individual notification list 1601 illustrated in FIG. 16 with the time at which the response 1501 has been received.

FIG. 20 is a flowchart of processing of periodically updating the individual notification list 1601. Upon the periodic update processing at intervals defined in the management target device 102 being started, in step S2001 of FIG. 20, a defined time held in the management target device 102 for determining whether or not to delete a management device from the individual notification list 1601 is obtained. In step S2002 of FIG. 20, the management target device 102 checks the final response times on the individual notification list 1601, and if there is a management device 101 of which the final response time falls after the defined time obtained in step S2001, the management target device 102 deletes that management device 101 from the individual notification list 1601. Through this configuration, even if a deletion request is not made by the management device 101, the number of management devices registered in the individual notification list 1601 can be prevented from increasing more than necessary.

Third Exemplary Embodiment

The network configuration, the hardware configuration, and the software configuration of a third exemplary embodiment are the same as those of the first or second exemplary embodiment. The third exemplary embodiment, however, differs from the first or second exemplary embodiment in that, when the communication control unit 220 of the management target device 102 is unable to respond to an information obtaining request from the management device 101, the main body control unit 210 of the management target device 102 registers an individual notification destination of the power supply mode.

Figure 17:
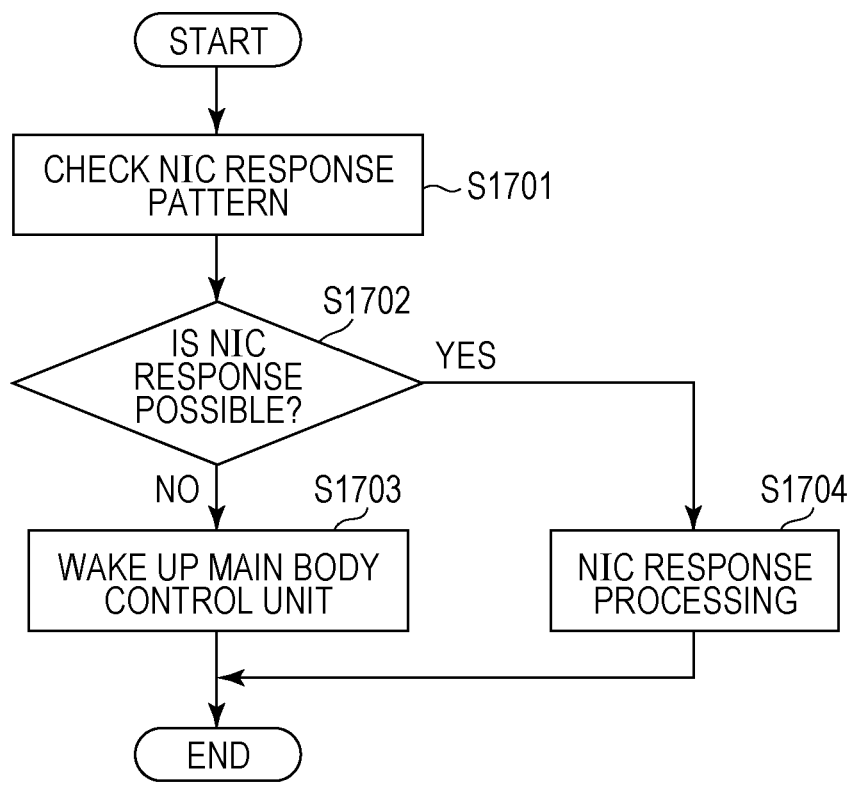
FIG. 17 illustrates a flowchart of processing of a communication control unit according to a third exemplary embodiment.

The processing of the third exemplary embodiment will be described with reference to flowcharts. First, the processing flow of the communication control unit 220 of the management target device 102 will be described with reference to FIG. 17. When the management target device 102 receives an information obtaining request from the management device 101, in step S1701, the management target device 102 determines whether or not the information obtaining request corresponds to an NIC response pattern (FIG. 9). If it is determined in step S1702 that the information obtaining request corresponds to an NIC response pattern, the processing proceeds to step S1704. In step S1704, the NIC responding unit 311 of the management target device 102 responds to the management device 101 in accordance with the NIC response pattern (FIG. 9). If it is determined in step S1702 that the information obtaining request does not correspond to an NIC response pattern, the processing proceeds to step S1703. In step S1703, the management target device 102 requests the power supply control unit 330 to supply power to the main body control unit 210. Upon being requested to supply power, the power supply control unit 330 supplies power to the main body control unit 210 so as to wake up the main body control unit 210. The communication control unit 220 then transmits the received packet information to the main body control unit 210 that has been woken up.

Figure 18:
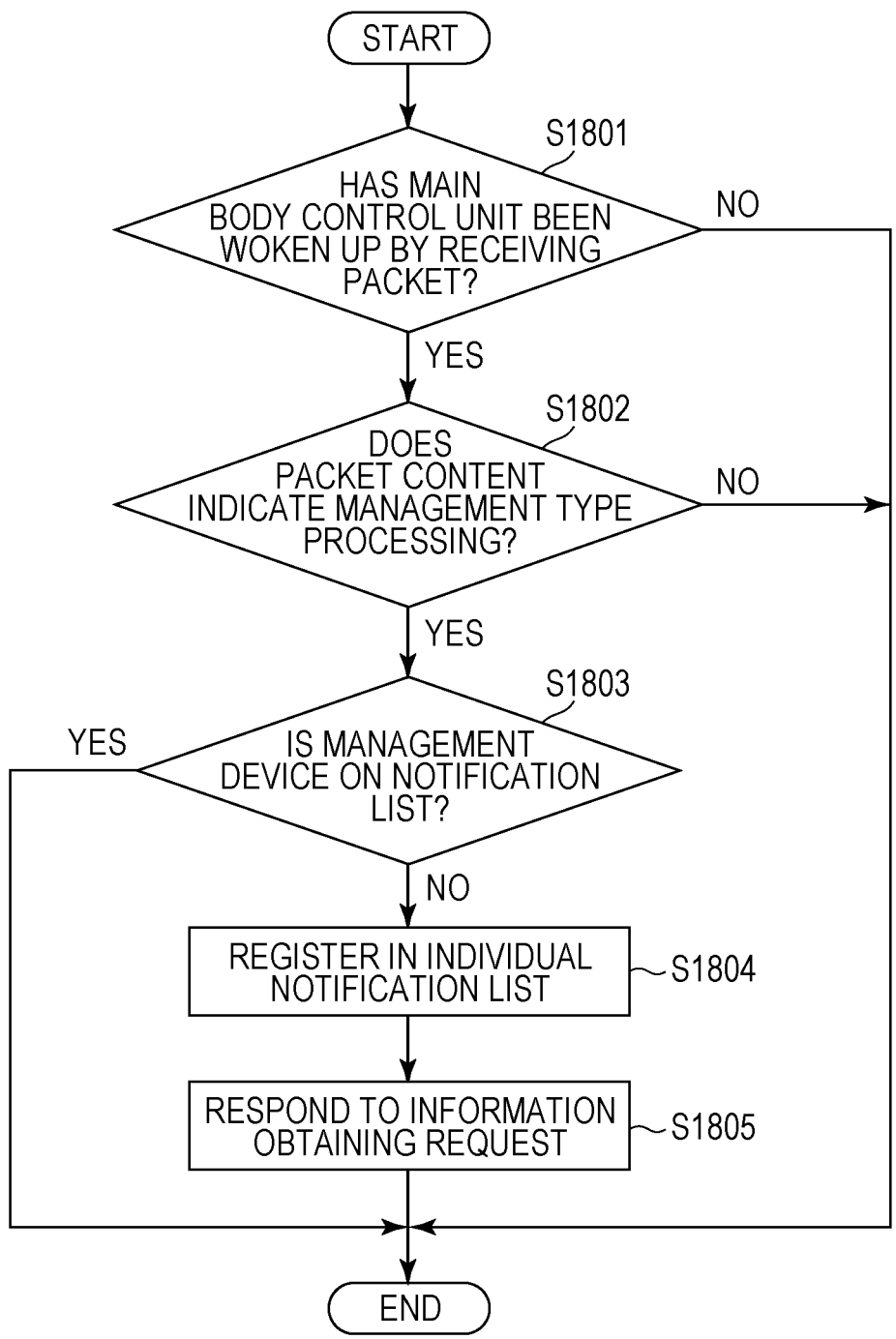
FIG. 18 illustrates a flowchart of processing of a main body control unit according to the third exemplary embodiment.

Subsequently, the processing flow of the main body control unit 210 that has been woken up in step S1703 will be described with reference to the flowchart illustrated in FIG. 18. In step S1801, the main body control unit 210, which has been woken up by receiving a packet, determines, through the notification registering/deleting unit 322, whether or not the main body control unit 210 has been woken up by receiving a packet through a network. If it is determined in step S1801 that the main body control unit 210 has not been woken up by receiving a packet through a network, the processing is terminated. Meanwhile, if it is determined that the main body control unit 210 has been woken up by receiving a packet through a network, the processing proceeds to step S1802. In step S1802, the notification registering/deleting unit 322 determines whether or not the content of the received packet indicates management type processing on the basis of a port number or the like. For example, the notification registering/deleting unit 322 determines whether or not the received packet is a management type packet by using a list 1901 of management type port numbers illustrated in FIG. 19. If it is determined in step S1802 that the received packet is not a management type packet, the processing is terminated. If it is determined in step S1802 that the received packet is a management type packet, the processing proceeds to step S1803. In step S1803, the notification registering/deleting unit 322 determines whether or not a management device 101 that has transmitted the packet is registered as a notification destination in the power supply mode individual notification list 1101 or 1601 illustrated in FIG. 11 or 16, and if it is determined that the management device 101 is registered in the individual notification list as a notification destination, the processing is terminated. Meanwhile, if it is determined in step S1803 that the management device 101 is not registered in the individual notification list, the processing proceeds to step S1804. In step S1804, the notification registering/deleting unit 322 registers the management device 101 in the individual notification list. Lastly, in step S1805, the information obtaining responding unit 323 creates a response packet to the information obtaining request from the management device 101 and responds to the management device 101 through the communication processing unit 310. With the third exemplary embodiment, even in a case in which the management device 101 makes an information obtaining request without the management device 101 requesting to be registered as an individual notification destination, the management device 101 can receive an individual notification. In addition, in a case in which the management target device 102 is woken up by a print request or the like, the management target device 102 does not need to make any registration into the individual notification list. Thus, an unnecessary registration operation can be suppressed by determining (step S1802) whether or not a received packet is a management type packet.

The exemplary embodiments described above make it possible to suppress, as compared to an existing technique, an instance in which a management target device returns from a low power consumption mode in response to a request for information from a management device. In addition, the management target device can remain in the low power consumption mode for an extended period of time.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-121840 filed Jun. 10, 2013, which is hereby incorporated by reference herein in its entirety.

What is claimed is:

1. A management device configured to manage, through a network, at least one management target device having multiple power supply modes, the management device comprising:
   a first obtaining unit configured to obtain a hop count between the management device and the management target device;
   a second obtaining unit configured to obtain, from the management target device, a notification destination range of an unspecified notification pertaining to a power supply mode;
   a determining unit configured to determine whether or not the unspecified notification pertaining to the power supply mode can be received from the management target device on the basis of the hop count obtained by the first obtaining unit and the notification destination range obtained by the second obtaining unit; and
   a requesting unit configured to request the management target device to register the management device as an individual notification destination on the basis of a determination result of the determining unit,
   wherein the determining unit determines whether or not a communication processing unit of the management target device can carry out response processing while the management target device is in a low power consumption mode, and
   wherein the requesting unit requests the management target device to register the management device as the individual notification destination in a case in which the determining unit determines that the unspecified notification pertaining to the power supply mode cannot be received from the management target device and that the communication processing unit cannot carry out the response processing while the management target device is in the low power consumption mode.

2. The management device according to claim 1, further comprising:
   a deleting unit configured to delete registration of an individual notification of a management target device that has ceased to be a management target.

3. The management device according to claim 1,
   wherein the management target device is an image forming device.

4. An management system, comprising:
   at least one management target device having multiple power supply modes; and
   a management device configured to manage the at least one management target device through a network,
   wherein the management device includes:
      a first obtaining unit configured to obtain a hop count between the management device and the management target device;
      a second obtaining unit configured to obtain, from the management target device, a notification destination range of an unspecified notification pertaining to a power supply mode;
      a determining unit configured to determine whether or not the unspecified notification pertaining to the power supply mode can be received from the management target device on the basis of the hop count obtained by the first obtaining unit and the notification destination range obtained by the second obtaining unit; and
      a requesting unit configured to request the management target device to register the management device as an individual notification destination on the basis of a determination result of the determining unit,
   wherein the management target device includes a registering unit configured to register the management device as the individual notification destination pertaining to the power supply mode in response to a request from the management device to register the management device as the individual notification destination pertaining to the power supply mode,
   wherein the management target device further includes a power control unit configured to shift the management target device to a normal power consumption mode in a case in which the management target device cannot respond to an information obtaining request from the management device while remaining in a low power consumption mode,
   wherein the management target device further includes a determining unit configured to determine whether or not to register the management device as the individual notification destination on the basis of content of the received information obtaining request, and
   wherein, in a case in which the determining unit determines to register the management device as the individual notification destination, the registering unit registers the management device as the individual notification destination pertaining to the power supply mode.

5. The management system according to claim 4,
   wherein the management target device further includes an updating unit configured to periodically update a list of individual notification destinations pertaining to the power supply mode on the basis of a final response time.

6. The management system according to claim 4,
   wherein the management target device is an image forming device.

7. A method for controlling a management device configured to manage, through a network, at least one management target device having multiple power supply modes, the method comprising:
   first obtaining of a hop count between the management device and the management target device;
   second obtaining of a notification destination range of an unspecified notification pertaining to a power supply mode from the management target device;
   determining whether or not the unspecified notification pertaining to the power supply mode can be received from the management target device on the basis of the hop count obtained in the first obtaining and the notification destination range obtained in the second obtaining; and
   requesting the management target device to register the management device as an individual notification destination on the basis of a determination result in the determining,
   wherein the determining further determines whether or not a communication processing unit of the management target device can carry out response processing while the management target device is in a low power consumption mode, and
   wherein the requesting further requests the management target device to register the management device as the individual notification destination in a case in which the determining determines that the unspecified notification pertaining to the power supply mode cannot be received from the management target device and that the communication processing unit cannot carry out the response processing while the management target device is in the low power consumption mode.

8. A non-transitory storage medium storing a program that causes at least one computer to implement the method according to claim 7.

9. A method for controlling a management system that includes at least one management target device having multiple power supply modes and a management device configured to manage, through a network, the at least one management target device, the method comprising:

first obtaining of a hop count between the management device and the management target device;

second obtaining of a notification destination range of an unspecified notification pertaining to a power supply mode from the management target device;

determining whether or not the unspecified notification pertaining to the power supply mode can be received from the management target device on the basis of the hop count obtained in the first obtaining and the notification destination range obtained in the second obtaining;

requesting the management target device to register the management device as an individual notification destination on the basis of a determination result in the determining; and registering the management device as the individual notification destination pertaining to the power supply mode in response to a request from the management device to register the management device as the individual notification destination pertaining to the power supply mode, wherein the management target device further includes a power control unit configured to shift the management target device to a normal power consumption mode in a case in which the management target device cannot respond to an information obtaining request from the management device while remaining in a low power consumption mode, wherein the management target device further includes determining whether or not to register the management device as the individual notification destination on the basis of content of the received information obtaining request, and wherein, in a case in which the determining determines to register the management device as the individual notification destination, the registering registers the management device as the individual notification destination pertaining to the power supply mode.

* * * * *